2,926,964

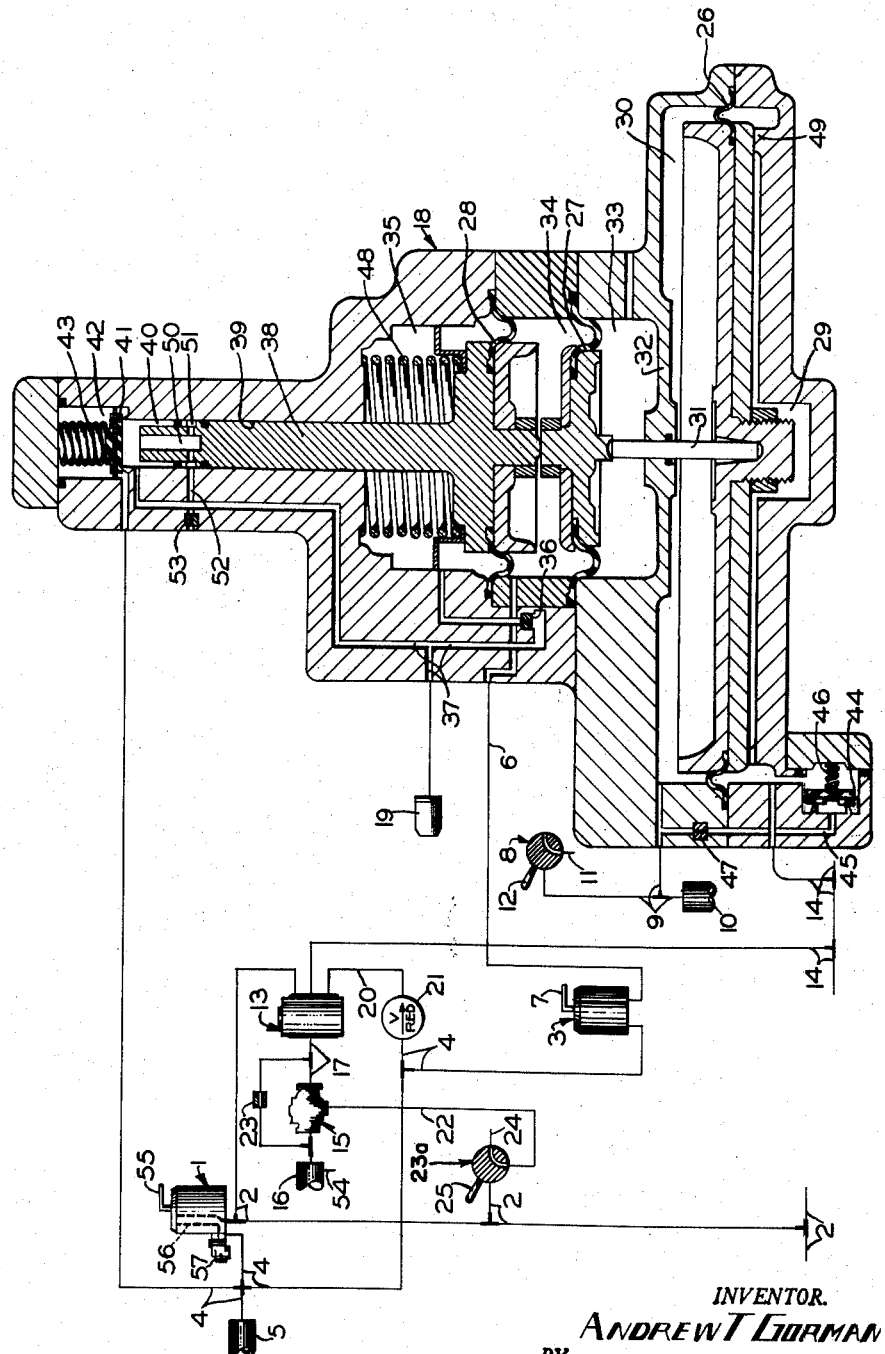

COMBINED FLUID PRESSURE AND VACUUM BRAKE APPARATUS

Andrew T. Gorman, Monroeville, Pa., assignor to Westinghouse Air Brake Company, Wilmerding, Pa., a corporation of Pennsylvania Application October 30, 1957, Serial No. 693,396

8 Claims. (Cl. 303—4)

This invention relates to combined fluid pressure and vacuum brake apparatus for use on a prime mover, such as a railway locomotive, whereby fluid pressure brakes on the prime mover may be applied and released in unison with or independently of the vacuum brakes on the connected hauled vehicles, such as the cars of a railway train.

According to the invention, there is provided an improved combined fluid pressure and vacuum brake apparatus comprising a control pipe, such as a brake pipe, in which pressure of fluid is varied by the operator for controlling brakes on the locomotive and cars in unison; a vacuum control valve device responsive to variations in pressure of fluid in this control or brake pipe to effect corresponding variations in the absolute pressure of fluid in a vacuum train pipe for controlling brakes on both the locomotive and connected cars according to the pressure of fluid thus provided in said train pipe; and a brake controlling valve device on the locomotive which comprises three coaxially arranged movable abutments that are cooperatively, though not fixedly, connected to each other so as to constitute a stack for controlling operation of a brake controlling valve that controls pressure of fluid in the locomotive brake cylinders. This movable abutment stack is subject to absolute pressure of fluid in the vacuum train pipe acting in opposition to the combined effect of absolute pressure of fluid in a volume, pressure of fluid in the locomotive brake cylinder and pressure of a bias spring, said volume normally being evacuated into the vacuum train pipe by way of a one-way flow communication so that when the vacuum train pipe is evacuated, the volume will be evacuated to substantially the same degree and cause an equalization of absolute pressures across one of said movable abutments, which one movable abutment is of greater effective area than the other two movable abutments. When vacuum train pipe vacuum is destroyed (that is, when absolute pressure of fluid in said train pipe is increased) by operation of the above-mentioned vacuum control valve device, fluid will be trapped in the volume and cause the brake controlling valve device to operate to provide in the locomotive brake cylinders, from a main reservoir, fluid at a super-atmospheric pressure substantially proportionate to the degree of fluid pressure differential across said one movable abutment, with the result that fluid pressure brakes on the locomotive, as well as vacuum brakes on the cars, will be controlled by variations in absolute pressure of fluid in the vacuum train pipe, for reasons subsequently to be explained.

The improved brake apparatus also preferably comprises an independent release valve normally cutting off the volume from atmosphere and operative to admit atmospheric air into said volume for causing the stack and brake controlling valve to be biased to a position for completely venting the locomotive brake cylinders and thus enable fluid pressure brakes on the locomotive to be released independently while vacuum brakes are applied on the cars; it being noted that the aforementioned one-way flow communication is sufficiently restricted to prevent the absolute pressure of fluid in the vacuum train pipe from being increased at a rate exceeding the rate at which it can be maintained from the vacuum reservoir on the locomotive, as will be understood from subsequent description. This improved brake apparatus also preferably comprises an independent application valve for providing in a chamber between the smaller of said movable abutments fluid at a selectable pressure corresponding to the degree of independent application of locomotive brakes desired, if vacuum brakes are released on the cars; if, however, vacuum brakes are applied on the cars, the brakes on the locomotive can be applied to any greater degree on the locomotive by providing sufficient fluid pressure in said chamber. Also with this apparatus, a partial release of locomotive brakes may be effected while brakes are applied on the locomotive and cars or, in other words, locomotive brakes may be applied to a lesser degree than the car brakes, by actuating the independent release valve to vent the volume to completely relieve the locomotive brakes from control according to the existing vacuum train pipe pressure, and then actuating the independent application valve to provide in said chamber fluid at a pressure corresponding to the degree of partial brake application desired on the locomotive.

It will thus be seen that with the apparatus embodying the invention, brakes on the locomotive are normally controlled in unison with those on the connected cars according to variations in absolute pressure of fluid in the vacuum train pipe, as effected by the vacuum control valve device responsively to operator-effected variations in pressure in the control pipe (brake pipe), rather than having locomotive brakes controlled directly according to variations in control pipe (brake pipe) pressure as heretofore proposed, so as to eliminate the tendency of the cars to run into the locomotive due to locomotive brakes applying ahead of the vacuum brakes on the cars. Also, the improved brake apparatus embodies a relatively simple brake controlling valve device which operates to apply and release fluid pressure brakes on the locomotive to any desired degree either in unison with or independently of the vacuum brakes on the connected cars.

In the accompanying drawing, the single figure is a diagrammatic view of an improved combined fluid pressure vacuum brake apparatus for use on a locomotive to control brakes on the locomotive and connected cars of the train.

Description

As shown in the drawing, the brake apparatus embodying the invention comprises an engineer's automatic brake valve device 1 for controlling pressure of fluid in a control pipe, such as a brake pipe 2, on the locomotive in the well-known manner; an independent application valve device 3 connected via pipe 4 to an air main reservoir 5 and comprising valve means (not shown) operable to provide in an independent application pipe 6 fluid at a selectable pressure corresponding to the extent of arcuate movement of a handle 7 from a normal position into an application zone; an independent release valve device 8 comprising valve means operable to lap an independent release pipe 9 leading to a volume 10 or connect said pipe 9 to an atmospheric vent pipe 11 according to whether a handle 12 is in a normal position, in which it is shown, or is moved to a release position, respectively; a vacuum control valve device 13 for controlling absolute pressure of fluid in a vacuum train pipe 14 according to variations in brake pipe pressure; a quick release valve device 15 for controlling a large capacity flow communication between a vacuum reservoir 16 and a pipe 17 leading to the device 13; and a brake controlling valve device 18 for controlling the pressure of fluid in locomotive brake cylinders 19 (only one of which is shown).

The independent application valve device 3 may be of the type disclosed in U.S. Patent 2,324,910, granted July 20, 1943, to E. S. Cook and assigned to the assignee of the present invention. The vacuum control valve device 13 and the quick release valve device 15 are preferably of the types fully shown and described in U.S. Patent 2,822,220, granted to Harry C. May on February 4, 1958, and assigned to the assignee of the present invention.

This vacuum control valve device 13 comprises, briefly, two coaxially arranged movable abutments (not shown) of different effective areas operable as a stack for controlling operation of valve means (not shown). This stack is controlled by pressure of fluid in the brake pipe 2 and absolute pressure of fluid in the vacuum train pipe 14 acting in opposition to atmospheric pressure and a bias pressure in a pipe 20 that is constantly charged with fluid at a super-atmospheric pressure by way of a branch of main reservoir pipe 4 and a reducing valve 21. This stack causes the last-mentioned valve means to respond to a chosen reduction in brake pipe pressure below its normal charge value to effect a proportionate increase in absolute pressure of fluid in the vacuum train pipe 14 and causes said valve means to respond to an increase in pressure in the brake pipe 2 to effect a proportionate decrease in absolute pressure in the vacuum train pipe 14.

This quick release valve device 15 comprises valve means (not shown) responsive to supply of fluid under pressure to a pipe 22 to establish a large capacity flow communication between pipe 17 and vacuum reservoir 16 and responsive to venting of pipe 22 to close said large capacity flow communication so that pipe 17 will be evacuated solely via and at the restricted rate controlled by a choke 23 bypassing the last-mentioned valve means. It is to be noted that, in the quick release valve device disclosed in the above-mentioned patent granted to Harry C. May, the bypass choke is installed in the casing of the quick release valve device; however, in the accompanying drawing the corresponding choke, 23, is shown in a separate bypass communication for facility of understanding.

Pressure of fluid in pipe 22 may be controlled in any suitable manner; however, for the sake of simplification, a quick release control valve device 23a of the cock type has been shown which is operative to connect pipe 22 selectively to a vent pipe 24 or to a branch of brake pipe 2 according to whether a handle 25 is in a normal position, in which it is shown, or is in a quick release position, respectively.

According to the invention, the brake controlling valve device 18 preferably comprises three coaxially arranged, spaced-apart movable abutments 26, 27, 28 cooperatively, though not positively, connected to each other so as to form a stack, as will be understood from subsequent description. Movable abutment 27, which is intermediate the movable abutments 26 and 28, has an effective area equal to that of movable abutment 28 but substantially smaller than the effective area of movable abutment 26. At the underside of movable abutment 26, as viewed in the drawing, is a chamber 29 constantly open to a branch of vacuum train pipe 14, and at the upper side thereof is a chamber 30 constantly open to a branch of pipe 9. Movable abutment 26 is cooperatively connected to movable abutment 27 through the medium of a coaxially arranged, cylindrical pusher stem 31 having sealing, slidably guided contact with the wall of an aligned bore through a casing partition 32 separating chamber 30 from an atmospheric chamber 33 at the underside of movable abutment 27. Between movable abutments 27 and 28 is a chamber 34 constantly open to pipe 6, and at the upper side of movable abutment 28 is a chamber 35 that is constantly open via a baffle choke 36 and a passage 37 to the locomotive brake cylinders 19.

Coaxially connected to movable abutment 28 is a cylindrical brake controlling valve 38 having sealing, slidably guided engagement with the wall of an aligned bore 39 that is open at one end to chamber 35 and open at the opposite end to a generally annular chamber 40 defined in part by a reduced diameter section of said valve and constantly open to a branch of passage 37. Arranged coaxially with valve 38 is a preferably disc-shaped brake cylinder supply valve 41 for controlling fluid pressure communication between passage 37 and a chamber 42 constantly open to a branch of main reservoir pipe 4, said valve 41 normally being biased by a light helical spring 43 in chamber 42 into seating contact with an annular valve seat rib encircling the inner end of bore 39 for preventing such communication.

A check valve 44 is interposed between chamber 29 and a passage 45 and preferably biased by a light helical spring 46 at its chamber 29 side for preventing fluid flow from chamber 29 to passage 45 but permitting flow from volume 10 and chamber 30 via a choke 47 and passage 45 to chamber 29. This check valve 44 thus permits an evacuation of fluid from volume 10 and in chamber 30 into the vacuum train pipe 14 and chamber 29.

*Operation*

Assume initially that all pipes, reservoirs and chambers contain air at atmospheric pressure. Under this condition, a helical bias spring 48 in chamber 35 of device 18 will bias movable abutment 28 into abutting contact with movable abutment 27, which, in turn, through the pusher stem 31, will bias movable abutment 26 into contact with a radially perforated stop rib 49 formed in the end wall of chamber 29, for thereby causing the movable abutment stack to bias the brake controlling valve 38 to a brake release position, in which it is shown, and in which the reduced diameter portion of valve 38 is disengaged from the brake cylinder supply valve 41 for permitting the latter to be held seated by the spring 43. With valve 38 in brake release position, passage 37 is uncovered to a bore-like opening 50 which extends axially inward from the reduced diameter end of said valve and is constantly open via suitable radial ports to an annular cavity 51 in the exterior of said valve, which cavity is then in registry with a brake cylinder release passage 52 that is open to atmosphere via a brake cylinder release choke 53, with the result that the brake cylinders 19 are opened to atmosphere via the communication just described.

*Initial charging*

To initially charge the apparatus, the independent application valve handle 7 and independent release valve handle 12 are moved to their respective normal positions, if not already there, for maintaining pipe 6 vented and pipe 9 lapped, respectively. The main reservoir 5 is then charged with fluid under pressure from the compressors (not shown) on the locomotive, and the vacuum reservoir 16 is evacuated via an exhauster pipe 54 leading to the exhausters (not shown) on the locomotive. The brake valve device 1 is actuated by a handle 55 to a running or release position, if not already there, for connecting the brake pipe 2 to a passage 56 constantly charged with fluid at the predetermined normal charge value of brake pipe pressure corresponding to the setting of a feed valve or reducing valve device 57 interposed between main reservoir pipe 4 and the passage 56. Handle 25 of quick release control valve device 23a is preferably moved to its release position for charging pipe 22 from the brake pipe 2 to establish the aforementioned large capacity flow communication between pipe 17 and the vacuum reservoir 16.

Pressure of fluid thus supplied to the brake pipe 2 will cause the vacuum control valve device 13 to operate to connect pipe 17 to vacuum train pipe 14 for causing the latter to be evacuated at a rapid rate via the above-mentioned large capacity flow communication until absolute pressure in the vacuum train pipe has been reduced to a normal value, as will be understood from previous description of device 13. As the absolute pressure in vacuum train pipe 14 and hence in chamber 29 of device 18 is reduced to this normal value, the absolute pressure of air hitherto bottled up at atmospheric pressure in pipe 9, volume 10 and chamber 30 by valve device 8 will be reduced via check valve 44 into the vacuum train pipe 14 at the rate controlled by the choke 47 and to substantially the same degree as absolute pressure in said train pipe is reduced. With absolute pressures thus substantially equalized across movable abutment 26, and chamber 34 vented via pipe 6 and valve device 3 as above assumed, spring 48 will operatively maintain the brake controlling valve 38 in its brake release position, in which it is shown, throughout initial charging.

At completion of initial charging, the quick release control valve handle 25 should be returned to its normal position, in which it is shown, for venting pipe 22 and thereby causing the quick release valve device 15 to operate to disestablish the aforementioned large capacity flow communication between the pipe 17 and vacuum reservoir 16, so that the vacuum control valve device 13 will operate to maintain the vacuum train pipe 14 against leakage of up to a maximum permissible rate as determined by the selected flow capacity of choke 23.

*Service application of brakes on locomotive and cars*

To effect a service application of brakes on the locomotive and connected cars of a train, the brake valve handle 55 is moved to a service position for causing a chosen reduction in brake pipe pressure corresponding to the degree of service brake application desired, and is then moved to a lap position for bottling up fluid in the brake pipe 2 at the chosen reduced value, in the well-known manner. The vacuum control valve device 13 will respond to this reduction in brake pipe pressure to effect a proportionate increase in absolute pressure in the vacuum train pipe 14 for causing brakes on the cars, which are controlled by pressure in the vacuum train pipe, to be applied to a degree corresponding to the extent of said chosen reduction in brake pipe pressure. Meanwhile, this reduction in absolute pressure in vacuum train pipe 14 and hence in chamber 29 of device 18 will cause movable abutment 26 to be moved upwardly against resistance of spring 48 and the lesser absolute pressure of fluid bottled up by check valve 44 in chamber 30, for thereby operatively shifting valve 38 to a brake application position, in which the reduced diameter end of valve 38 sealingly abuts the supply valve 41 and holds the latter unseated against resistance of spring 43 for respectively sealing off passage 37 from brake cylinder release passage 52 and opening passage 37 to main reservoir pipe 4. With valve 41 thus unseated, main reservoir air will flow via passage 37 to the brake cylinders 19 and also via baffle choke 36 to chamber 35 until pressure in chamber 35 has increased sufficiently to bias the movable abutment stack downwardly and thus shift valve 38 to a lap position, in which the reduced diameter end of valve 38 sealingly abuts valve 41 but permits seating of valve 41 by spring 43, for thereby causing fluid to be bottled up in the locomotive brake cylinders 19 at a super-atmospheric pressure substantially proportionate to the fluid pressure differential across the movable abutment 26.

It will thus be noted that, in the improved apparatus, the fluid pressure brakes on the locomotive are not controlled directly according to variations in brake pipe pressure, as heretofore proposed, but, like the vacuum brakes on the cars, are controlled by absolute pressure of fluid in the vacuum train pipe, which absolute pressure is indirectly controlled by the vacuum control valve device 13 responsively to variations in super-atmospheric pressure in a control pipe, such as the brake pipe 2. With this arrangement, locomotive brakes cannot apply ahead of the car brakes and cause undesirable run-in of the cars into the locomotive, as could heretofore occur due to the somewhat delayed response of the vacuum control valve device upon a reduction in brake pipe pressure.

*Release of a service brake application on the locomotive and cars*

To effect a partial release of brakes on the locomotive in unison with those on the connected cars of the train, the brake valve handle 55 is moved to its running or release position and then to its lap position for causing brake pipe pressure to be restored to an extent corresponding to the degree of brake release desired and thus causing the vacuum control valve device 13 to operate to effect a corresponding reduction in absolute pressure in the vacuum train pipe 14. The consequent reduction in absolute pressure in chamber 29 will unbalance the movable abutment stack and thus shift valve 38 downwardly to its brake release position for releasing fluid under pressure from the brake cylinders 19 via passage 37, opening 50, cavity 51 and passage 52 at the rate controlled by brake cylinder release choke 53, until brake cylinder pressure as noted in chamber 35 has been reduced to an extent corresponding substantially to the existing fluid pressure differential across movable abutment 26; whereupon the valve 38 will be retuned to its lap position for bottling up fluid in the brake cylinders at the corresponding reduced pressure.

To effect a complete release of brakes on the locomotive and cars, quick release valve handle 25 is moved to its quick release position, and brake valve handle 55 is moved to, and allowed to remain in, running or release position, for causing brake pipe pressure to be restored to its normal charge value and, in turn, causing absolute pressure in vacuum train pipe 14 to be rapidly reduced to its normal value, in the same manner as described in connection with initial charging, with the result that valve 38 will be moved to and remain in brake release position for completely venting the brake cylinders 19.

*Independent release of locomotive brakes*

To effect an independent release of fluid pressure brakes on the locomotive while vacuum brakes are applied on the connected cars, independent release valve handle 12 is moved to its release position for connecting pipe 9 to vent pipe 11 and thus causing atmospheric air to flow into volume 10 and chamber 30 of device 18 at a substantially unrestricted rate. The consequent increase in pressure in chamber 30 will promptly shift the movable abutment stack downwardly and thus carry valve 38 to its brake release position for completely venting brake cylinders 19 on the locomotive via communication heretofore described. It is to be noted that atmospheric air will flow via choke 47 and past check valve 44 into the vacuum train pipe 14 and chamber 29; however, the flow capacity of choke 47 is substantially less than that of choke 23 so that, despite this atmospheric "leak," the vacuum train pipe will be maintained evacuated to the extent called for by the existing reduced value of brake pipe pressure, in the same manner as if there were unintentional leakage of atmospheric air into the train pipe. In other words, vacuum in the train pipe 14 will be maintained from the vacuum reservoir 16 by way of valve device 13, pipe 17, and coke 23, and thus assure that vacuum brakes on the cars will not be undesirably applied to a greater degree.

*Independent application of brakes on locomotive*

Assume that the brake pipe 2 is charged to its normal charge value and that the absolute pressure in vacuum train pipe 14 is reduced to its normal value by operation of valve device 13. Under this condition, fluid pressure brakes on the locomotive and vacuum brakes on the cars will be concurrently released. To effect an independent application of brakes on the locomotive while the vacuum brakes on the connected cars are thus released, independent application valve handle 7 is moved arcuately from its normal position into the application zone for providing in independent application pipe 6 and hence in chamber 34 of device 18 fluid at a pressure corresponding to the degree of independent application desired. Assume now that absolute pressure has been increased in the vacuum train pipe 14 for causing an application of brakes on the cars, and also on the locomotive in consequence of the fluid pressure differential thus created across movable abutment 26. To apply brakes on the locomotive to a greater degree, the independent application valve handle 7 is positioned to provide in chamber 34 fluid at a pressure corresponding to the degree of locomotive brake application desired. This pressure in chamber 34 acting over the effective area of movable abutment 28 should be sufficient to produce an upward force on said movable abutment which exceeds the upward force transmitted to movable abutment 28 via movable abutments 26, 27 and pusher stem 31 and corresponding to the net effective pressure acting on movable abutment 26, so that the valve 38 will be controlled solely by pressure of fluid in chamber 34 acting on movable abutment 28, and the downward force exerted by fluid pressure in chamber 34 acting on movable abutment 27 will overcome the upward force exerted on movable abutment 26 by the fluid pressure differential thereacross. This is so, because if the pressure fluid supplied to chamber 34 does not impose an upward force on the movable abutment 28 exceeding the upward force operatively transmitted thereto from the movable abutment 26, it will be apparent that the upward force exerted by fluid pressure in chamber 34 on movable abutment 28 will be neutralized and offset by a downward force exerted by fluid pressure in chamber 34 on movable abutment 27, since the movable abutments 27, 28 have equal effective areas; and hence pressure of fluid provided in chamber 34 will have no effect on the operation of valve 38, with the result that said valve will be controlled in the same manner as if chamber 34 were vented.

It will be noted that according to the invention, locomotive brakes will be controlled selectively according to pressure of fluid in the independent application pipe 6 or according to the extent by which absolute pressure in the vacuum train pipe 14 exceeds the bottled-up absolute pressure of fluid in the volume 10; in other words, locomotive brakes will not be cumulatively applied according to the value of fluid pressure in chamber 34 and the magnitude of the fluid pressure differential across movable abutment 26. This is desirable to prevent sliding of the locomotive wheels which could otherwise occur if locomotive brakes were applied according to the combined effects of the fluid pressure differential across movable abutment 26 and the pressure of fluid in chamber 34, such as would be the case if movable abutment 27 and chamber 33 were eliminated and stem 31 extended from casing partition 32 through chamber 34 into contact with movable abutment 28.

If, while brakes on the locomotive and cars are applied in unison, it is desired to effect a partial release of locomotive brakes (or, in other words, to apply locomotive brakes to a lesser degree than the car brakes), the independent release valve handle 12 is moved to release position to vent volume 10 and chamber 30 and thus destroy the upward force previously exerted on the movable abutment stack by the fluid pressure differential across movable abutment 26; and then the independent application valve handle 7 is moved arcuately to provide in chamber 34 fluid at any selectable value of pressure corresponding to the degree of partial brake application desired on the locomotive. Thus, under this condition, locomotive brakes will be applied solely according to the value of fluid pressure provided in the independent application pipe 6 and chamber 34, in substantially the same manner as above described in connection with an independent application of locomotive brakes while vacuum brakes on the cars are released.

Having now described the invention, what I claim as new and desire to secure by Letters Patent, is:

1. In a locomotive brake apparatus for controlling fluid pressure brakes on a locomotive and vacuum brakes on the connected cars of a train, the combination of a normally vented locomotive brake cylinder, a normally evacuated vacuum train pipe in which absolute pressure of fluid is increased for normally causing a brake application on both the locomotive and cars, means defining a volume, means providing a one-way flow communication for permitting evacuation of fluid from said volume into said vacuum train pipe and preventing fluid flow in the reverse direction, a normally vented independent application pipe, operator-controlled means for providing in said independent application pipe fluid at a selectable pressure corresponding to the degree of independent application of locomotive brakes desired, and a brake controlling valve device controlled by absolute pressures in said volume and vacuum train pipe and pressures of fluid in said brake cylinder and in said independent application pipe and operative when said independent application pipe is vented to provide in said brake cylinder fluid at a super-atmospheric pressure substantially proportionate to the extent by which absolute pressure of fluid in said vacuum train pipe exceeds the absolute pressure of fluid in said volume, and operative when absolute pressures in said volume and vacuum train pipe are substantially equal to provide in said brake cylinder fluid at a super-atmospheric pressure corresponding to the pressure of fluid in said independent application pipe.

2. The combination according to claim 1, wherein said one-way flow communication is restricted, and including operator-controlled independent release valve means normally closing off said volume from atmosphere and operative to open said volume to atmosphere for thereby causing locomotive brakes to be completely released independently of the degree of vacuum brake application then in effect on the cars provided said independent application pipe is then vented or causing locomotive brakes to be applied, independently of the degree of brake application then in effect on the cars, to a degree corresponding to the pressure of fluid in said independent application pipe if the latter is then charged with fluid under pressure.

3. In a locomotive brake apparatus for controlling fluid pressure brakes on a locomotive and vacuum brakes on the connected cars of a train, the combination of a normally vented locomotive brake cylinder, a source of fluid under pressure, a normally evacuated vacuum train pipe in which absolute pressure of fluid is increased and decreased relative to a normal value for normally causing an application and release of brakes concurrently on both the locomotive and cars, means defining a volume, means providing a one-way flow communication for permitting evacuation of fluid from said volume into said vacuum train pipe and preventing fluid flow in the reverse direction, and a brake controlling valve device comprising valve means for controlling pressure of fluid in the brake cylinder and three cooperatively connected movable abutments for controlling operation of said valve means and bias means for operatively biasing said valve means to a position for venting the brake cylinder, the first of said movable abutments being subject to absolute pressure of fluid in said vacuum train pipe opposing absolute pressure of fluid in said volume, the second and third of said movable abutments being of equal effective area and both of smaller effective area than said first movable abutment, and said third movable abutment being interposed between said first and second movable abutments, said second movable abutment being operatively connected to said valve means and subject to pressure of fluid in a chamber opposing pressure of fluid in the brake cylinder, and said third movable abutment being subject to atmospheric pressure opposing pressure of fluid in said chamber and capable of abutting contact with said second movable abutment, and operator-controlled independent application means normally venting said chamber and operative to supply to said chamber fluid at a selectable pressure corresponding to the degree of independent application of locomotive brakes desired, said movable abutments being arranged to so control operation of said valve means as to provide in said brake cylinder from said source, while said chamber is vented, fluid at a super-atmospheric pressure substantially proportionate to the extent by which absolute pressure of fluid in said vacuum train pipe exceeds absolute pressure of fluid in said volume, and to provide in said brake cylinder from said source, while absolute pressures of fluid in said vacuum train pipe and volume are substantially equal, fluid at a pressure corresponding substantially to the pressure of fluid in said chamber, said second and third movable abutments being biased in opposite directions by pressure of fluid in said chamber for assuring that if said chamber is charged with fluid under pressure at a time when there is a fluid pressure differential across said first movable abutment, said valve means will control brake cylinder pressure selectively according to the value of pressure in said chamber or to the magnitude of such fluid pressure differential depending upon whether chamber pressure or such fluid pressure differential exerts a preponderant force on said valve means in a brake cylinder charging direction, whereby locomotive brakes will never be applied according to the cumulative effects of chamber pressure and the magnitude of such fluid pressure differential for thereby assuring against the development of an excessive locomotive brake cylinder pressure which could cause sliding of the locomotive wheels.

4. The combination according to claim 3, wherein said one-way flow communication is restricted, and including operator-controlled independent release means normally cutting off said volume from atmosphere and operative to connect said volume to atmosphere for so biasing said first movable abutment as to render it ineffective to control operation of said valve means irrespective of the value of absolute pressure of fluid in said vacuum train pipe, whereby said valve means will be controlled exclusively by said second movable abutment for providing in said brake cylinder fluid at a pressure corresponding to whatever pressure is then provided in said chamber by said independent application means.

5. The combination according to claim 3, wherein said one-way flow communication is restricted, and including a normally charged brake pipe, brake valve means for controlling pressure of fluid in the brake pipe, a vacuum reservoir, vacuum control valve means, flow restricting means interposed between said vacuum reservoir and vacuum control valve means and of greater flow capacity than the flow capacity of said one-way flow communication, said vacuum control valve means being responsive to a reduction in brake pipe pressure below normal charge value to effect a proportionate increase in absolute pressure in said vacuum train pipe and responsive either to a subsequent increase in brake pipe pressure or to leakage of atmospheric air into the vacuum train pipe to connect said vacuum train pipe to said vacuum reservoir via said flow restricting means for evacuating said vacuum train pipe, and operator-controlled independent release means normally cutting off said volume from atmosphere and operative to connect said volume to atmosphere for so biasing said first movable abutment as to render it ineffective to control operation of said valve means irrespective of the value of absolute pressure of fluid in said vacuum train pipe, whereby said valve means will be controlled exclusively by said second movable abutment for providing in said brake cylinder fluid at a pressure corresponding to whatever pressure is then provided in said chamber by said independent application means and absolute pressure in said vacuum train pipe will be maintained via said flow restricting means against atmospheric air admitted at a more restricted rate into said vacuum train pipe via said one-way flow communication while said volume is connected to atmosphere by said independent release means.

6. In a locomotive brake apparatus for controlling fluid pressure brakes on a locomotive and vacuum brakes on the connected cars of a train, the combination of a vacuum source, a vacuum train pipe in which fluid is normally maintained evacuated by way of said source to a predetermined value of absolute pressure for normally causing brakes on the locomotive and cars to be concurrently released and in which absolute pressure of fluid is increased above said predetermined value for causing an application of brakes on both the locomotive and cars, means defining a volume separate from said source, means providing a restricted one-way flow communication for permitting evacuation of fluid from said volume into said vacuum train pipe and preventing fluid flow in the reverse direction, a locomotive brake cylinder, a brake controlling valve device comprising valve means for controlling pressure of fluid in said brake cylinder and a plurality of movable abutments coaxially arranged in a stack for controlling operation of said valve means, said stack being subject to vacuum train pipe pressure opposing volume pressure and brake cylinder pressure and responsive to an increase in absolute pressure in said vacuum train pipe to above said predetermined value to provide in said locomotive brake cylinder fluid at a super-atmospheric pressure corresponding substantially to the extent by which absolute pressure in the vacuum train pipe exceeds that in said volume, and operator-controlled independent release valve means normally disconnecting said volume from atmosphere and operable to an independent release position, in which said volume but not said source is connected to atmosphere, for causing said brake controlling valve device to operate to reduce the pressure of fluid in said brake cylinder, whereby when brakes are concurrently applied on the locomotive and cars brakes on the locomotive may be partially or completely released independently of those on the cars, and brakes on the cars will be maintained applied to a degree corresponding to the extent vacuum train pipe pressure has been increased above said predetermined value.

7. In a locomotive brake apparatus for normally controlling fluid pressure brakes on a locomotive and vacuum brakes on the connected cars of a train in unison and optionally permitting an independent release of brakes on the locomotive while brakes on the cars are maintained applied, the combination of a control pipe in which pressure of fluid is varied by an operator for normally controlling brakes on the locomotive and cars in unison, a vacuum source, a vacuum train pipe, vacuum control valve means operative automatically to so control connection of said vacuum train pipe with said vacuum source and atmosphere as to effect variations in absolute pressure of fluid in said vacuum train pipe proportionate to the operator-effected variations in pressure of fluid in said control pipe and maintain pressure in the vacuum train pipe at a value corresponding to the pressure provided in the control pipe, means defining a volume separate from said vacuum source, means providing a restricted one-way flow communication for permitting fluid to be evacuated from said volume into said vacuum train pipe and preventing fluid flow in the reverse direction, a locomotive brake cylinder, brake controlling valve means controlled by absolute pressure of fluid in said vacuum train pipe opposing absolute pressure of fluid in said volume and pressure of fluid in said brake cylinder and operative to provide in said brake cylinder fluid at a super-atmospheric pressure substantially proportionate to the extent by which absolute pressure in said vacuum train pipe exceeds that in said volume, and operator-controlled independent release valve means normally disconnecting said volume from atmosphere and operable to connect said volume to atmosphere for causing said brake controlling valve means to operate to release fluid under pressure from said brake cylinder irrespective of the existing value of absolute fluid pressure in the vacuum train pipe, whereby brakes on the locomotive and cars will normally be applied and released in unison according to increases and decreases, respectively, in absolute pressure of fluid in the vacuum train pipe as automatically effected by said vacuum control valve means according to variations in control pipe pressure, and whereby when brakes on the locomotive and cars are concurrently applied, brakes on the locomotive may be released independently of those on the cars by admitting atmospheric air into said volume.

8. In a locomotive brake apparatus for controlling fluid pressure brakes on a locomotive and vacuum brakes on the connected cars of a train, the combination of a normally evacuated vacuum train pipe in which absolute pressure of fluid is increased for normally causing a brake application on both the locomotive and cars, means defining a volume containing fluid at the normally evacuated value of pressure in the vacuum train pipe, a normally vented independent application pipe which is chargeable with fluid at a selectable pressure corresponding to the degree of independent application of locomotive brakes desired, a normally vented locomotive brake cylinder, and a brake controlling valve device controlled by pressures of fluid in said vacuum train pipe, said volume, said independent application pipe and said brake cylinder, said valve device being operative when said independent application pipe is vented to provide in said brake cylinder fluid at a super-atmospheric pressure substantially proportionate to the extent by which absolute pressure of fluid in said vacuum train pipe exceeds the absolute pressure of fluid in said volume, and operative when absolute pressures in said volume and vacuum train pipe are substantially equal to provide in said brake cylinder fluid at a super-atmospheric pressure corresponding to the pressure of fluid in said independent application pipe.

References Cited in the file of this patent

UNITED STATES PATENTS

| | | |
|---|---|---|
| 1,318,245 | Turner | Oct. 7, 1919 |
| 1,412,662 | Ives et al. | Apr. 11, 1922 |
| 2,822,220 | May | Feb. 4, 1958 |